United States Patent [19]
Bradford et al.

[11] 3,806,580
[45] Apr. 23, 1974

[54] PROCESS FOR THE RECOVERY OF THIOTUNGSTATE SPECIES FROM ORGANIC COMPOSITIONS

[75] Inventors: James Lewis Bradford, Oklahoma City, Okla.; Mark M. Woyski, La Habra, Calif.

[73] Assignee: Kerr-McGee Chemical Corp., Oklahoma City, Okla.

[22] Filed: Apr. 24, 1972

[21] Appl. No.: 246,908

[52] U.S. Cl. .............................. 423/54, 75/101 BE
[51] Int. Cl. .............................................. C01g 41/00
[58] Field of Search ................. 423/54; 23/312 ME; 75/101 BE

[56] References Cited
UNITED STATES PATENTS

| | | | |
|---|---|---|---|
| 3,083,085 | 3/1963 | Lewis et al. | 423/54 |
| 2,963,342 | 12/1960 | Rilloton et al. | 423/54 |
| 3,079,226 | 2/1963 | Newkirk | 75/101 BE |
| 3,293,004 | 12/1966 | Musgiove et al. | 23/312 ME |

OTHER PUBLICATIONS
Coleman et al., "Proceedings of International Conference on Peaceful Uses of Atomic Energy," Vol. 28, 1958, pp. 278–288.

Primary Examiner—Herbert T. Carter
Attorney, Agent, or Firm—William G. Addison; Clark E. DeLarvin

[57] ABSTRACT

The present invention relates to a process for the recovery of a thiotungstate from an organic composition. More particularly, the present invention relates to an improvement in a solvent extraction process wherein tungsten in an alkaline solution is sulfidized to convert it to a thiotungstate species, contacted with an organic phase comprising an extractant in an organic diluent whereby the thiotungstate is extracted into the organic phase and subsequently recovered. The improvement comprises contacting the thiotungstate containing organic phase with sulfur dioxide whereby at least a portion of the thiotungstate is converted to a tungstate species, stripping the tungstate species from the organic phase with an aqueous salt solution and recovering the tungstate.

8 Claims, No Drawings

PROCESS FOR THE RECOVERY OF THIOTUNGSTATE SPECIES FROM ORGANIC COMPOSITIONS

BACKGROUND OF THE INVENTION

The ability of tungsten to harden metal with which it is alloyed makes it a valuable element in the manufacture of various metal products such as machine-tool steels. Further, drawn tungsten wire is indispensable in the manufacture of filaments for electric lamps. In the manufacture of tungsten metal, the principal raw materials used are concentrates of scheelite-type ores and concentrates of wolframite-type ores. The two types of ore differ substantially in chemical composition and are generally processed by different chemical decomposition methods. For example wolframite is usually decomposed by heating with an aqueous solution of sodium hydroxide which takes the tungsten in solution as sodium tungstate. On the other hand, the decomposition of scheelite is almost entirely effected by subjecting finely ground scheelite ore to the leaching effect of a hot concentrated hydrochloric acid to form an insoluble tungstic acid. However, some impurities remain with the tungstic acid, such as molybdenum and silica. Thus, the tungstic acid requires further purification steps.

Solvent extraction processes have been known heretofore for recovering tungsten from acidic solutions. An example of such a process is disclosed in U. S. Pat. No. 3,051,516. However, no completely successful solvent extraction process is known for the recovery of tungsten from alkaline solutions. A recent attempt was reported ["Recovery and Purification of Tungsten by the Liquid Exchange Process," *Unit Processes in Hydrometallurgy-Metallurgical Society Conferences*, Volume 24, Feb. 24–28, 1963, (pp. 504–514)] wherein about 40 percent of the tungsten present in an alkaline solution could be recovered at high pH values (pH = 13 or higher) utilizing a quaternary amine.

SUMMARY OF THE INVENTION

Broadly the present invention relates to a process for the recovery of thiotungstate species from an organic composition. More particularly, the invention relates to an improvement in a process for recovering tungsten from an aqueous alkaline solution containing the same wherein the tungsten is first sulfidized to thiotungstate species, contacted with an organic phase comprising an extractant in an organic diluent whereby the thiotungstate is extracted into the organic phase and subsequently recovered. The improvements provided by the present invention comprise contacting the thiotungstate containing organic phase with sulfur dioxide whereby at least a portion of the thiotungstate species is converted to a tungstate species, stripping the tungstate from the organic phase with an aqueous salt solution and recovering the tungstate. It has been discovered that sulfur dioxide operates as an oxidizing agent in that it converts the thiotungstate species in the extractant to a strippable tungstate form. Further, the use of sulfur dioxide (in any of its forms) does not cause degradation of the extractant.

DESCRIPTION OF A PREFERRED EMBODIMENT

The present invention is applicable to the recovery of a thiotungstate species from an organic composition such as, for example, an organic extractant. It is particularly applicable to a solvent extractant process wherein an aqueous alkaline brine containing tungsten is sulfidized to convert the tungsten therein to a thiotungstate species and subsequently contacted with an organic phase comprising an extractant in an organic diluent whereby the thiotungstate is extracted into the organic phase. It has been discovered that, when such a thiotungstate containing organic phase is contacted with sulfur dioxide the thiotungstate is converted to a readily strippable tungstate.

The aqueous alkaline solution containing tungsten is sulfidized by contacting the alkaline solution with a sulfidizing agent such as hydrogen sulfide gas. Further, the tungsten may be sulfidized with an aqueous solution containing hydrogen sulfide, thiometalates, polysulfides or combinations thereof. Examples of suitable thiometalates include sodium thioarsenate and sodium thioarsenite. The applicable polysulfides includes sodium, potassium and ammonium polysulfides.

The alkaline solution should be contacted with at least the stoichiometric amount of sulfidizing agent required to convert all of the tungsten contained therein to the thiotungstate species. When the alkaline solution is a brine, such as is found at Searles Lake, a considerable excess of the stoichiometric requirements for conversion of all the tungsten to the thiotungsttate species is required. Preferably, there will be present from thiotungstate 3 to 10 times the stoichiometric amount of sulfidizing agent required to convert all of the tungsten in the brine to a thiotungstate species. Examples of the thiotungstate species contemplated by the instant invention are $WS_4^{--}$, $WOS_3^{--}$, $WO_2S_2^{--}$ and $WO_3^{--}S$.

When using an aqueous solution of a sulfidizing agent, the amount of the sulfidizing agent present in the aqueous solution will depend, of course, upon the ratio of sulfidizing solution to alkaline solution employed, contact time, temperature, amount of tungsten in the alkaline solution and the like. When using an aqueous solution of hydrogen sulfide to sulfidize a brine such as is found at Searles Lake, it is advantageous to utilize at least 10 grams per liter of hydrogensulfide in the solution. hydrogen sulfide In accordance with the process of the instant invention an alkaline solution containing thiotungstate is contacted with an organic phase comprising an extractant in an organic diluent. The term extractant as used herein contemplates compounds represented by the general formulas:

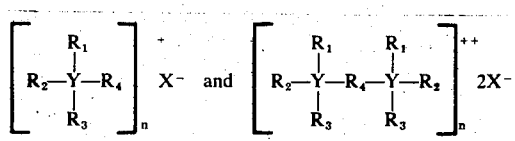

wherein $R_1$, $R_2$, $R_3$, and $R_4$, are aliphatic hydrocarbon radicals containing from 1 to 18 atoms, X is an anion such as $CL^-$, $SO_4^{--}$, $CO_3^{--}$ and the like, Y is selected from the group consisting of nitrogen and phosphorous and $n$ is an integer of from 1 to 3, equal to the valence of the anion. A preferred group of compounds are those wherein $R_4$ is a lower alkyl group having from 1 to 4 carbon atoms and $R_1$, $R_2$ and $R_3$ are selected from long chain aliphatic hydrocarbon groups having from 8 to 18 carbon atoms, A particularly preferred group of compounds are the quaternary ammonium chlorides. Examples of typical ammonium and phosphonium radicals which extract thiotungstates includes: trimethyl myristyl ammonium; trimethyl palmityl ammonium; trimethyl stearyl ammonium; trimethyl coco ammonium; trimethyl tallow ammonium; dimethyl dipalmityl ammonium; dimethyl di(oleyl-linoleyl) ammonium; dimethyl dicoco ammonium; dimethyl amyl-lauryl ammonium; methyl tricaprylyl ammonium; N-coco-N, N-dimethyl-N', N' ,N'-trimethyl-1, 3-propylene diammonium; N-tallow-N, N-dimethyl-N', N',N-trimethyl-1, 3-propylene diammonium; dodecyltributyl phosphonium, tributyl monomethyl phosphonium; trioctyl monomethyl phosphonium; and octyltributyl phosphonium.

In addition to the extractant, the organic phase includes an inert organic diluent. The applicable organic diluents include hydrocarbon solvents such as is ooctane, kerosene, benzene, toulene, xylene, isodecane, fuel oils, mineral oils, hexane, heptane, octane, and the like. Chlorinated hydrocarbons, such as chloroform also are suitable. Further, the diluent may include functional groups providing that the functional groups do not adversely affect the extraction. The essential feature of the organic diluent is that it be substantially brine-immiscible. The preferred organic diluents have a solubility in water of less than about 0.5 percent.

The organic diluent may contain a modifier in an amount of up to about 10 percent by weight of the total organic phase. Typical of such modifiers are long chain aliphatic alcohols such as capryl alcohol, isodecanol, tridecanol, 2-ethyl hexanol, and the like. The addition of such modifiers improves the solubility of the extractant in the organic diluent. Particularly good results have been obtained when the organic diluent contained from about 4 to 8 percent by weight of such modifiers.

The extractant may be employed in widely varying amounts. Generally, the amount present will be from about 1 to 15 percent by weight, based on the total organic phase, with an amount of from about 2 to 10 percent by weight being particularly preferred.

The amount of organic phase to be used for most efficient extraction is from about 0.15 to 10 times the volume of aqueous alkaline solution to be treated. The preferred ratio of organic phase to aqueous alkaline solution is of course dependent upon the concentration of extractant in the organic phase, the temperature at which the extraction is performed, the contact time between the two phases, and the amount of thiotungstate in the alkaline solution. Generally, the ratio of organic phase to aqueous alkaline solution will be in the range of from 0.25:1 to 2:1.

The contact time between the organic phase and the aqueous alkaline solution is an important variable to consider when extracting thiotungstate from an alkaline brine, such as is found at Searles Lake. In practice, contact times of from 1 minute to 60 are satisfactory, with about 3 minutes to 5 minutes per contact being especially preferred at temperatures of from about 20° C to 60° C. Iodine and bromine are also extracted. Methods are known, separate from this invention, to remove these ions should their presence interfere with tungsten extraction.

After contacting a thiotungstate containing alkaline solution with the organic phase, where by the thiotungstate is extracted into the organic phase, the loaded organic phase may be recovered by virtue of its immiscibility.

The thiotungstate containing organic is contacted with at least the stoichiometric amount of sulfur dioxide to convert substantially all of the higher thiotungstate species ($WS_4^{--}$ and $WOS_3^{--}$) to a lower thiotungstate species ($WO_2S_2^{--}$ and $WO_3S^{--}$) or a tungstate species ($WO_4^{--}$). The lower thiotungstate species are stripped from the loaded organic with the stripping solutions contemplated herein. However, when it is desired to obtain a tungstate product substantially free of sulfur or sulfur compounds the thiotungstate containing organic is contacted with at least the stoichiometric amount of $SO_2$ to convert substantially all of the thiotungstate species to the tungstate species ($WO_4^{--}$). Generally, it is preferred to provide about twice the stoichiometric amount of sulfur dioxide required to ensure complete conversion of the thiotungstate to the readily strippable tungstate form, The exact amount of sulfur dioxide required is, of course, a function of the quantity of thiotungstate in the organic, the distribution of the thiotungstate species ($WS_4^{--}$, $WOS_3^{--}$, $WO_2S_2^{--}$ and $WO_3S^{--}$) in the organic, presence of other oxidizable species in the organic and the like.

It is contemplated that the term "sulfur dioxide" as used herein shall include sulfur dioxide in gaseous form, aqueous solutions of sulfur dioxide-containing compounds and combinations thereof. The sulfur dioxide containing compounds contemplated are aqueous solutions of sulfur dioxide and aqueous solutions containing sulfur dioxide in the form of sulfurous acid, bisulfite ion, sulfite ion and the like. Examples of such compounds include $H_2SO_3$; $Na_2SO_3$; $(NH_4)_2SO_3$ and the like.

When using an aqueous solution of sulfur dioxide compound, the conversion of a thiotungstate to a tungstate is most complete when the pH of the solution is maintained below 7.0. Indeed, very little conversion occurs at a pH in excess of 7.0. Therefore, it generally is preferred to maintain the pH within a range of from about 4.5 to 6.5 and particularly good results are obtained at a pH of from about 5.0 to 6.0. At such pH values a contact time of less than 3.0 minutes is generally sufficient for complete conversion.

Once the thiotungstate in the loaded organic has been converted to a tungstate species it is readily strippable with an aqueous salt solution. The ratio of aqueous salt solution to organic is not critical and is generally in the range of from about 1:10 to 10:1. An organic to aqueous ratio of about 5:1 is usually preferred at ambient temperatures.

The equilibrium pH of the stripping solution is important. At a pH of less than about 7 little stripping of the tungstate from the organic occurs. Therefore, it is necessary to add a base to the strip solution to ensure that the equilibrium pH of the solution will remain above 7. Generally it is preferred to maintain the pH above about 9 and particularly good results are obtained at a pH above about 12. The use of a base in stripping solutions is well known to those skilled in the art and includes such basic compounds as $NH_4OH$, $NaOH$ and the like. Preferred strip solutions include a 3M $NH_4Cl$-3M $NH_4OH$ solution, as those skilled in the art will appreciate.

In accordance with one embodiment of the present invention a thiotungstate loaded organic phase is contacted sequentially with sulfur dioxide gas and an aqueous salt solution whereby the thiotungstate is converted to a tungstate and stripped from the organic into the aqueous salt solution. The tungstate subsequently is recovered from the aqueous salt solution by known methods.

EXAMPLE I

A 50 milliliter portion of a thiotungstate loaded organic phase is obtained. The organic phase comprises 10 percent of a tricaprylyl methyl ammonium chloride extractant, an organic diluent, and 1.18 g/l of tungsten in the form of thiotungstate species. Gaseous sulfur dioxide is bubbled through the loaded organic phase for five minutes at ambient temperature. The organic phase then is analyzed by means of ultraviolet spectrophotometry. The analysis shows that the characteristic absorption peaks for $WS_4^{--}$ and $WOS_3^{--}$ are not present, thus demonstrating that the thiotungstate species have been converted to a tungstate species. The loaded organic phase then is contacted with an equal volume of a 3M $NH_4Cl$-3M $NH_4OH$ strip solution for 3 minutes. A sample of the organic phase subsequently is obtained and analyzed for tungsten content. The analysis shows that 95 percent of the tungsten has been removed by the strip solution.

When the same example is repeated with the exception that the sulfur dioxide treatment is omitted similar analyses shows that the higher thiotungstate species $WOS_3^{--}$ and $WS_4^{--}{}_0$ are still present and only 38 percent of the tungsten is removed by the strip solution. Thus, this example demonstrates the efficacy of $SO_2$ to convert a thiotungstate species in an organic phase to a tungstate species whereby it is readily strippable from the organic phase with an aqueous salt solution.

EXAMPLE II

A tungsten-containing alkaline solution is sulfidized to convert the tungsten therein to a thiotungstate species and contacted with an organic phase comprising an organic diluent and 10 percent by volume Aliquat–336 (a commercially available tricaprylyl methyl ammonium chloride) extractant whereby substantially all of the thiotungstate is complexed with the extractant in the organic phase. A 200 ml portion of the thiotungstate loaded organic is obtained, analysed and found to contain 0.84 g/l tungsten. The organic phase is shaken with 100 ml of a 3M $NH_4HSO_3$ solution having a pH of about 5.5 for one minute. Following this treatment, the organic phase is separated from the bisulfite solution and contacted with an equal volume of 3M $NH_4Cl$-3M $NH_4OH$ solution (pH 9.5) for one minute. The organic phase then is recovered and x-ray fluorescence analysis of the recovered organic phase shows that more than 90 percent of the tungsten has been stripped. Thus, this example demonstrates the applicability of an aqueous solution of an $SO_2$ containing compound in the process of the instant invention.

EXAMPLE III

An aqueous alkaline solution containing tungsten is sulfidized to convert the tungsten to thiotungstate and contacted with an organic phase comprising 10 percent by volume of a quaternary ammonium chloride extractant and an organic diluent. The organic phase is recovered, analyzed by x-ray fluorescence and found to contain 1.54 g/l tungsten. 25 milliliter portions of the thiotungstate loaded organic phase are contacted and shaken with 5 ml portions of a 0.5M $NaHSO_3$ solution which have been adjusted to pH values of 1 through 9 (using concentrated NaOH or HCl). The contact time is 3 minutes, and is followed by a 3-minute contact with 8 ml portions of a 4.0M NaCl-0.3M NaOH stripping solution of a pH of about 12. The organic phases are recovered, samples obtained and analyzed by x-ray fluorescence. The results are as set forth in Table III below.

TABLE III

| Sample No. | Initial pH of Bisulfite Solution | Tungsten Remaining In Organic g/l | Percent Tungsten Stripped |
|---|---|---|---|
| 1 | 1 | 0.40 | 74 |
| 2 | 2 | 0.28 | 82 |
| 3 | 3 | 0.32 | 79 |
| 4 | 4 | 0.27 | 82.9 |
| 5 | 5 | 0.14 | 91 |
| 6 | 6 | 0.20 | 87 |
| 7 | 7 | 1.27 | 17.5 |
| 8 | 8 | 1.38 | 10 |
| 9 | 9 | 1.38 | 10 |

The above results demonstrate that substantial tungsten recovery is obtained using a bisulfite solution of pH less than 7 followed by stripping with an aqueous salt solution of pH greater than 12.

EXAMPLE IV

Example 4 is repeated with the exception that the bisulfite solution contact time is one minute. The thiotungstate to tungstate conversion, measured in terms of tungsten recovery, again reaches a maximum using a bisulfite solution having a pH below 7, and appears to be most efficient at a pH of about 5. After conversion of the thiotungstate (at a pH of about 5) approximately 95 percent stripping of the organic phase is achieved with an aqueous ammonium salt solution having a pH of >9.

While the present invention has been described with respect to certain preferred embodiments thereof, it is to be understood, of course, that certain changes, modifications and the like may be made therein without departing from its true scope as defined by the appended claims.

What is claimed is:

1. In a process for recovering tungsten from an alkaline brine containing the same in the form of a tungstate wherein the tungsten is sulfidized to a thiotungstate species, contacted for a time of from 1 to 60 minutes with an organic phase comprising an extractant in an inert organic diluent which is substantially brine-imiscible whereby the thiotungstate is extracted into the organic phase and subsequently recovered; said extractant being selected from the group of compounds represented by the general formulas:

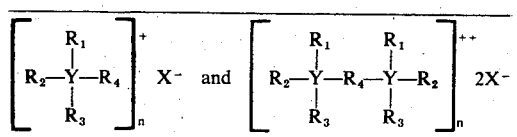

wherein $R_1$, $R_2$, $R_3$, and $R_4$ are aliphatic hydrocarbon radicals containing from 1 to 18 carbon atoms, X is an anion selected from the group consisting of Cl, $SO_4$ and $CO_3$, Y is selected from the group consisting of nitrogen and phosphorous and n is an integer of from 1 to 3, equal to the valence of the anion, the improvements which comprise:

contacting the thiotungstate containing organic phase with sulfur dioxide whereby at least a portion of the thiotungstate species is converted to a tungstate species, contacting the organic phase with an aqueous salt solution having a pH greater than 7 whereby the tungstate is stripped from the organic phase into the aqueous salt solution and recovering said tungstate containing solution.

2. The process of claim 1 wherein said sulfur dioxide is in an aqueous solution having a pH of less than 7.

3. The process of claim 2 wherein the sulfur dioxide is in the form of an ion selected from the group consisting of sulfite ions and bisulfite ions.

4. The process of claim 1 wherein said thiotungstate containing organic phase is contacted with gaseous sulfur dioxide and said aqueous salt solution has a pH greater than 9.

5. The process of claim 1 wherein the sulfur dioxide is in an aqueous solution having a pH within the range from about 4.5 to 6.5 and the organic phase subsequently is contacted with an aqueous salt solution having a pH greater than 9.

6. The process of claim 5 wherein the aqueous salt solution comprise a solution of $NH_4Cl$ and $NH_4OH$.

7. The process of claim 6 wherein the brine is a Searles Lake brine.

8. The process of claim 1 wherein the aqueous salt solution comprises a solution of $NH_4Cl$ and $NH_4OH$.

* * * * *

UNITED STATES PATENT OFFICE
CERTIFICATE OF CORRECTION

Patent No. 3,806,580           Dated April 23, 1974

Inventor(s)  James L. Bradford and Mark M. Woyski

It is certified that error appears in the above-identified patent and that said Letters Patent are hereby corrected as shown below:

Column 2, line 34, "$WS_4$--, $WOS_3$--, $WO_2S_2$-- and $WO_3S$" should read $WS_4^=$, $WOS_3^=$, $WO_2S_2^=$ and $WO_3\overline{\overline{S}}$ line 44, after "tion." delete -- hydrogen sulfide -- line 61, after "18" insert therefor -- carbon -- line 62, "Cl-, $SO_4$--, $CO_3$--" should read -- $Cl^-$, $SO_4^=$, $CO_3^=$

Column 3, line 19, "is ooc-" should read -- isooc- --

Column 4, line 7, "($WS_4$-- and $WOS_3$--)" should read --($WS_4^=$ and $WOS_3^=$)

line 8, "($WO_2S_2$-- and $WO_3S$---)" should read -- ($WO_2S_2^=$ and $WO_3\overline{\overline{S}}$) -- line 9, "($WO_4$--)." should read ($WO_4^=$). -- line 16, "($WO_4$--)." should read -- ($WO_4^=$). -- lines 23 and 24, "($WS_4$--, $WOS_3$--, $WO_2S_2$-- and $WO_3S$--)" should read -- ($WS_4^=$, $WOS_3^=$, $WO_2S_2^=$ and $WO_3\overline{\overline{S}}$) -- lines 63 and 64, "3M $NH_4Cl$-3M $NH_4OH$" should read -- 3$\underline{M}$ $NH_4Cl$-3$\underline{M}$ $NH_4OH$ --

Column 5, line 18, "$WS_4$-- and $WOS_3$--" should read -- $WS_4^=$ and $WOS_3^=$ -- line 22, "3M $NH_4Cl$-3M $NH_4OH$" should read -- 3$\underline{M}$ $NH_4Cl$-3$\underline{M}$ $NH_4OH$ -- line 30, "$WOS_3$-- and $WS_4$--." should read -- $WOS_3^=$ and $WS_4^=$ -- continued

UNITED STATES PATENT OFFICE
CERTIFICATE OF CORRECTION

Patent No. 3,806,580          Dated April 23, 1974

Inventor(s) James L. Bradford and Mark M. Woyski

It is certified that error appears in the above-identified patent and that said Letters Patent are hereby corrected as shown below:

Page two

Column 5, line 48, "3M NH₄HSO₃" should read -- 3$\underline{M}$ NH₄HSO₃ --
          line 51, "3M NH₄Cl-3M" should read -- 3$\underline{M}$ NH₄Cl-3$\underline{M}$ --
Column 6, line 2, "0.5M NaHSO₃" should read -- 0.5$\underline{M}$ NaHSO₃ --
          line 6, "4.0M NaCl-0.3M NaOH" should read --
              4.0$\underline{M}$ NaCl-0.3$\underline{M}$ NaOH --

Signed and sealed this 19th day of November 1974.

(SEAL)
Attest:

McCOY M. GIBSON JR.
Attesting Officer

C. MARSHALL DANN
Commissioner of Patents